United States Patent
Nortier

(10) Patent No.: US 6,616,118 B2
(45) Date of Patent: Sep. 9, 2003

(54) LIP SEAL FOR PISTON-TYPE FLUSHOMETER

(75) Inventor: Richard A. Nortier, Westchester, IL (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 09/900,839

(22) Filed: Jul. 9, 2001

(65) Prior Publication Data

US 2003/0020032 A1 Jan. 30, 2003

(51) Int. Cl.[7] .............................................. F16K 31/12
(52) U.S. Cl. ........................................... 251/40; 251/44
(58) Field of Search ............................. 251/40, 44, 45, 251/38, 39

(56) References Cited

U.S. PATENT DOCUMENTS

| | | | | | |
|---|---|---|---|---|---|
| 1,539,455 A | * | 5/1925 | Young et al. | ................. | 251/40 |
| 2,007,652 A | * | 7/1935 | Kocour | ......................... | 251/40 |
| 2,153,904 A | * | 4/1939 | Wilson | ......................... | 251/40 |
| 3,791,618 A | * | 2/1974 | Nelson et al. | ................. | 251/38 |
| 4,261,545 A | * | 4/1981 | Allen | ......................... | 251/40 |
| 5,476,244 A | * | 12/1995 | Carroll et al. | ................. | 251/40 |
| 5,881,993 A | * | 3/1999 | Wilson et al. | ................. | 251/40 |

* cited by examiner

Primary Examiner—Gene Mancene
Assistant Examiner—John Bastianelli
(74) Attorney, Agent, or Firm—Cook, Alex, McFarron, Manzo, Cummings & Mehler, Ltd.

(57) ABSTRACT

A piston assembly for use in a flush valve. The piston assembly is movable in the body toward and away from the valve seat to control flow from the inlet through the outlet. There is a relief valve in the piston assembly for venting a flush valve pressure chamber to the flush valve outlet. The piston assembly has an outwardly directed lip seal which bears against an interior wall of the body, with the lip seal being held between facing elements of the piston assembly. The lip seal includes an insert and an elastomer overlying and substantially enclosing the insert. Both the elastomer and the insert have portions extending toward the flush valve body wall and the insert has support elements which are in contact with the facing elements of the piston assembly to take the load from such elements off of the elastomer body of the lip seal.

16 Claims, 2 Drawing Sheets

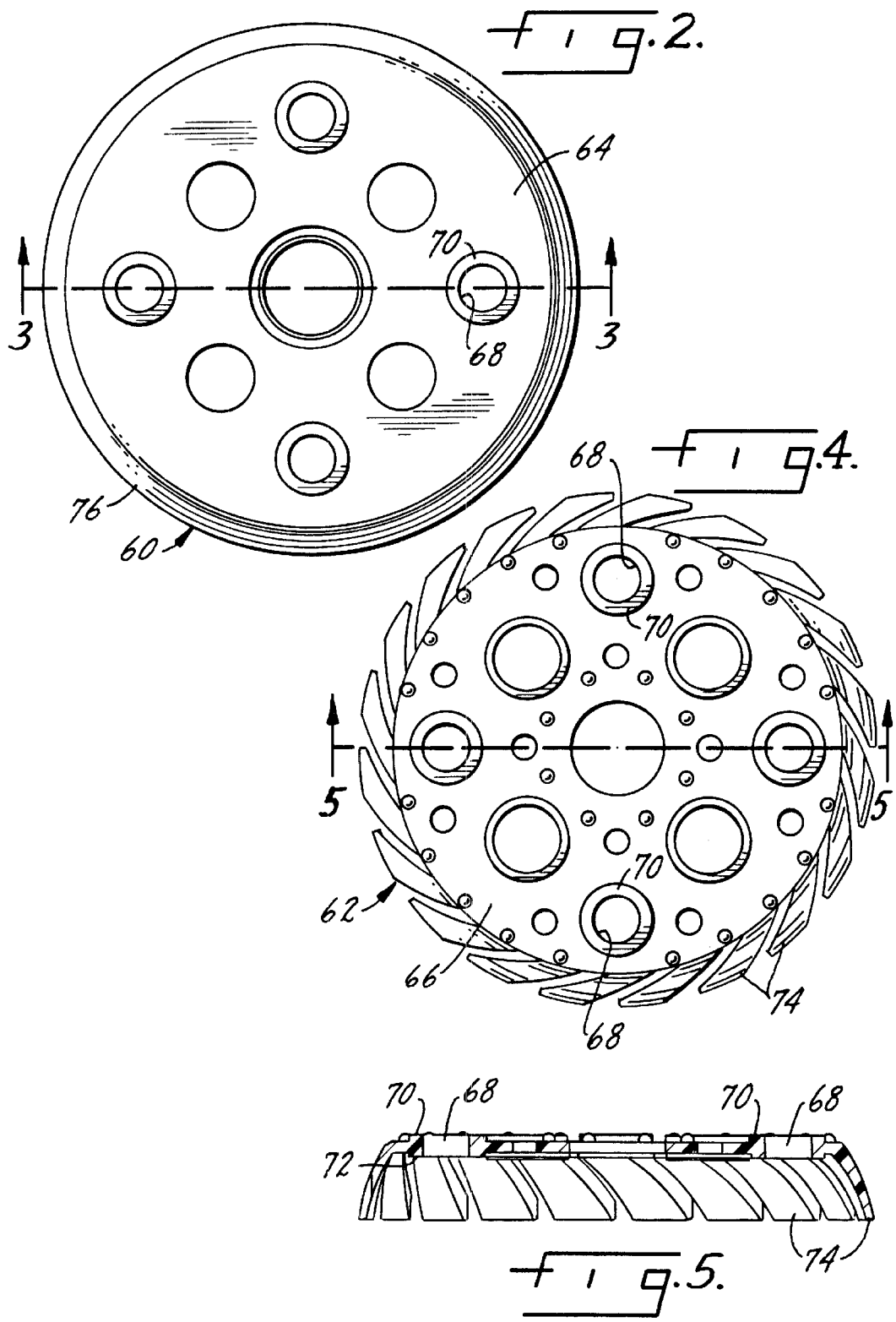

LIP SEAL FOR PISTON-TYPE FLUSHOMETER

THE FIELD OF THE INVENTION

The present invention relates to piston-type flush valves or flushometers and more specifically to an improved seal for the piston assembly. The piston assembly reciprocates during operation of the flush valve and the lip seal creates a dynamic barrier between the pressure chamber above the piston assembly and the discharge outlet below it. The piston seal of the present invention is advantageous in that it requires less stringent assembly criteria, provides a seal which has a substantially extended life, and improves flush volume consistency.

The lip seal in the present invention functions as a bearing to keep the piston assembly sliding along its axis, straight in the bore of the flush valve. The particular seal design reduces the effect of retaining screw torque on the lip geometry. The lip seal comprises an insert and an elastomer molded over the insert. The insert functions to stiffen the seal itself. The injection molded assembly of the insert and the elastomer has a plurality of raised bosses that carry the load applied by the screws that hold the piston assembly together. The presence of such bosses transfers the load between the mating parts of the piston assembly and prevents excessive deformation of the lip seal geometry.

In lip seals currently used in this environment, if there is distortion, which may result from over application of torque to the screws that hold the piston assembly together, the piston will not cycle properly with an extreme result being the piston lodging in the bore of the flush valve. Further, the applied screw torque required for proper assembly of the piston components causes the upper edge of the seal to expand outwards, decreasing the clearance between the lip seal and the bore of the flush valve body. One result can be that the piston can wedge in the bore. Another result is that over time the seal itself will wear, resulting in a change in the friction between the seal and the bore of the flush valve which results in less consistency in the flush volume when the valve is operated.

The present invention provides an insert in which there are flexible fingers incorporated into the perimeter of the lip seal which center the lip seal, reinforce the elastomer of the lip seal, and maintain a uniform pre-load applied by the lip seal to the wall of the chamber within which the piston assembly moves. The fingers of the insert have a helical twist which extends the effective length of the fingers which consequently reduces the stress on the insert itself. This design also allows the fingers to overlap which distributes the compressive load more uniformly through the seal.

SUMMARY OF THE INVENTION

The present invention relates to piston-type flushometers and more specifically to an improved lip seal for use in such an environment.

A primary purpose of the invention is to provide a lip seal which has less stringent assembly criteria, provides improved flush volume consistency and a piston assembly with a substantially increased effective life.

Another purpose is a piston assembly lip seal as described which has an insert which carries and distributes the torque load from the screws that attach the lip seal to the piston assembly.

Another purpose of the invention is to provide a lip seal which has reinforcing fingers extending outwardly toward the body of the flush valve which function to center the seal, reinforce the elastomer at the lip seal, and maintain a uniform pre-load by the seal against the bore of the flush valve within which it moves.

Another purpose is a lip seal for the use described which maintains consistency in valve operation over the life of the valve.

Other purposes will appear in the ensuing specification, drawings and claims.

BRIEF DESCRIPTION OF THE DRAWINGS

The invention is illustrated diagrammatically in the following drawings wherein:

FIG. 2 is a top view of the lip seal;

FIG. 4 is a top view of the lip seal insert; and

FIG. 5 is a section along plane 5—5 of FIG. 4.

DESCRIPTION OF THE PREFERRED EMBODIMENT

The present invention relates to an improved seal for a piston-style flushometer. In prior devices of this type, which are essentially an elastomer molded over a brass insert, the torque applied by the screws which attach the seal into the piston assembly may cause the upper or outer edge of the seal to expand, decreasing the clearance between the lip seal and the bore of the flush valve body. This in turn can increase the friction between the seal and the bore. As the friction force increases, the duration of the flush cycle may increase and this increases the amount of water delivered in a cycle of operation. The friction is not an issue on the upstroke of the piston, as there is a significant pressure difference pushing the piston upward, and the geometry of the seal allows it to move freely in this direction. Friction becomes an issue on the downstroke of the piston because the pressure is slowly increasing in the chamber above the piston assembly and the geometry of the seal naturally resists motion in this direction to insure a tight seal. The present invention solves these problems in that the seal includes an insert, preferably formed of plastic, which not only carries the load applied by the screws to hold the seal to the piston assembly, thus preventing excessive deformation of the lip seal geometry, but includes flexible fingers incorporated into the perimeter of the seal which act to center the seal, reinforce the elastomer, and maintain a uniform pre-load by the seal against the bore within which it moves. The fingers are angled or formed in a helix so that they overlap each other which distributes the compressive load more uniformly through the body of the seal. Further, by having a uniform load applied by the seal against the bore of the flush valve body, flushometer operation is consistent throughout the life of the valve itself.

The specific valve shown as the embodiment of the invention is that sold by Sloan Valve Company of Franklin Park, Ill., under the trademark NAVAL. Other forms of piston-type flushometers may equally utilize the improved seal of the present invention.

Figure 1:
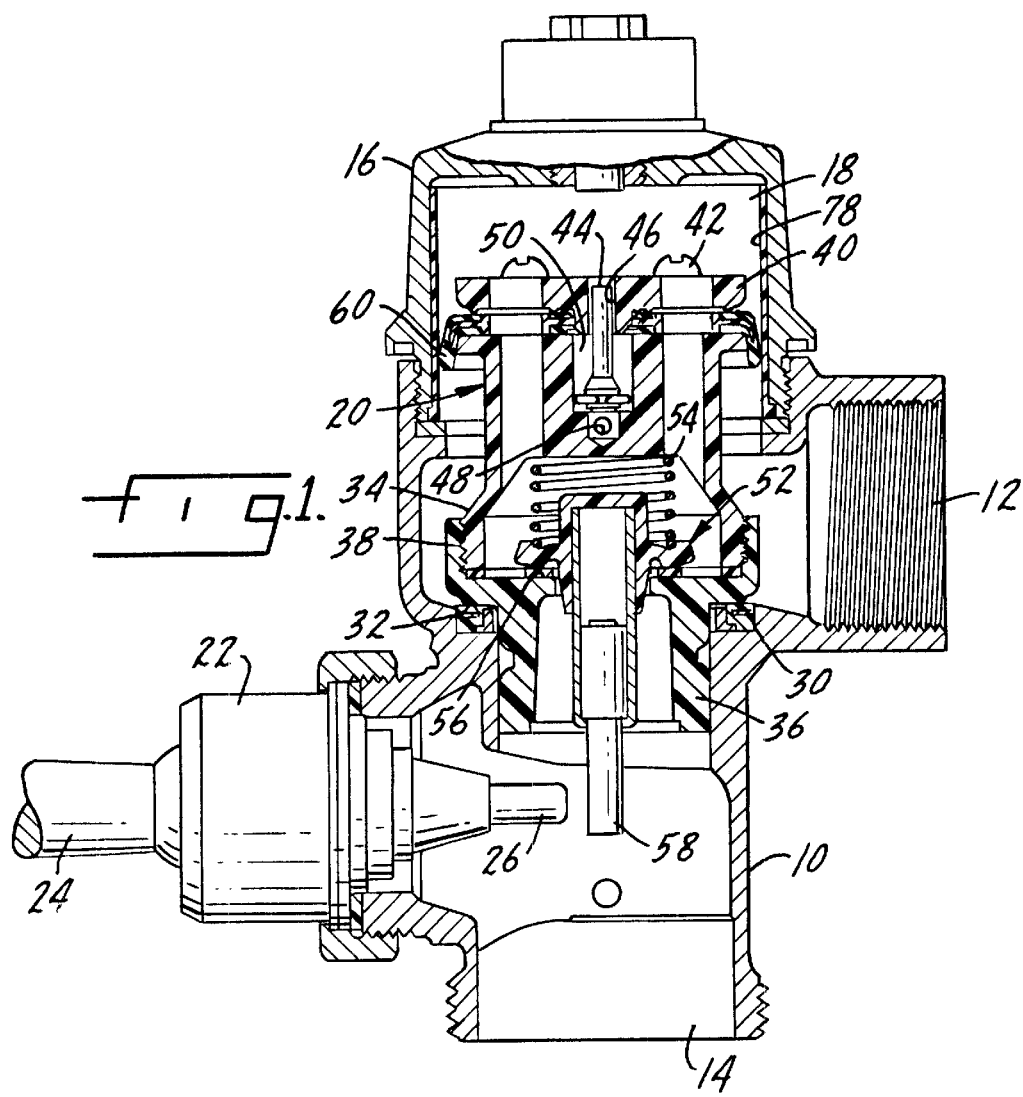
FIG. 1 is a partial axial section through a flush valve of the type described.
Figure 3:
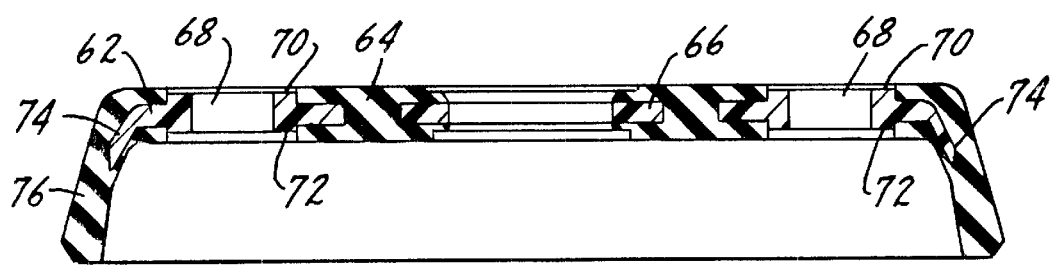
FIG. 3 is a section along plane 3—3 of FIG. 2.

In FIG. 1, the flush valve body is indicated at 10 and has an inlet 12 and an outlet 14. There is a top cover 16 which is threadedly attached to the body 10 and defines a pressure chamber 18 positioned above a piston assembly indicated generally at 20.

Adjacent the outlet 14 there is a handle assembly 22 which has a conventional manual handle 24 which, when activated, will move an interior plunger 26 which will cause the relief valve of the piston assembly to move off its seat to institute the flushing cycle. This is conventional in valves of this type. The invention is equally usable in a piston-type flush valve which has automatic operation, such as by an infrared sensing system.

The body 10 includes a valve seat 30, with the piston assembly 20 having a surface 32 which closes upon the valve seat to close flow between the inlet 12 and the outlet 14.

The piston assembly 20 includes a piston 34 and a guide 36 threadedly attached, as at 38. The piston assembly has a top plate 40 mounted by screws 42 to the piston 34. A rod 44 moves within a passage 46 in the top plate 40 to control the flow of water from an opening 48 in the piston 34. The opening 48 is connected to the inlet 12 and water will flow through the opening 48 into a chamber 50 around the rod, and then outwardly through the passage 46 into the pressure chamber 18. The space between rod 44 and passage 46 functions as the bypass orifice. Water within the pressure chamber 18 maintains the piston assembly on its valve seat 30 to close flow between the inlet and the outlet.

There is a relief valve 52 biased by a spring 54 onto a relief valve seat 56. The relief valve has a stem 58 which extends downwardly into the body 10 and is positioned adjacent the plunger 26. In operation, when the handle is moved, the plunger will move into the body 10 causing the relief valve to tilt off its seat, permitting the pressure chamber 18 to vent through the outlet 14 and permitting the piston assembly to thereby move up, off its seat 30, so that there is direct flow between the inlet and the outlet. As is known in the art, flow through the bypass orifice determines flow into the pressure chamber 18 to control the time during which the piston is off the valve seat and thus the volume of flow through the flush valve.

The present invention is specifically concerned with the lip seal 60 which is mounted in the piston assembly by the screws 42 between the top plate 40 and the piston 34. It is the application of torque to the screws 42 which, in the past, may cause the above-described problems during the life of the flush valve.

The seal 60 is formed with an insert 62 and an elastomer 64 overmolded on the insert. Focusing first on the insert, it includes a central body 66 having four openings 68, one for each of the four screws 42 which hold the lip seal in position in the piston assembly. Surrounding each of the openings 68 is an upwardly-extending boss 70 and a downwardly-extending boss 72. When the elastomer 64 is molded around the insert 62, the elastomer will extend approximately 0.005" beyond the upper and lower facing surfaces of the bosses 70 and 72, but the elastomer will not cover the bosses. When the lip seal is assembled, the elastomer will be compressed around the bosses, but the bosses at each opening will carry the load applied by the screws in mounting the lip seal to the piston assembly.

Extending peripherally about the outside of the insert 62 are a plurality of uniformly spaced helically extending fingers 74, which are covered by the lip portion 76 of the elastomer. The fingers stiffen the lip portion of the seal and provide a uniform compressive force by the lip seal against the wall 78 of the cover 16. By having the fingers formed in a helical configuration, the effective length of the fingers is extended, which allows them to overlap each other, which more uniformly distributes the compressive load throughout the body of the seal. Further, by extending the effective length of the finger, the actual stress applied to the plastic insert is reduced.

The lip seal, with the fingers which reinforce and distribute the load of the seal, functions to maintain the piston sliding along its axis straight in the bore or against the wall 78 of the cover 16. The reinforcements in the lip portion of the seal center the seal, reinforce the elastomer, and are effective to maintain a uniform pre-load by the seal against the wall upon which it moves. This in turn provides for consistent operation of the flush valve.

Whereas the preferred form of the invention has been shown and described herein, it should be realized that there may be many modifications, substitutions and alterations thereto.

The embodiments of the invention in which an exclusive property or privilege is claimed are as follows:

1. A flush valve including a body having an inlet and an outlet, a valve seat at said outlet, a piston assembly movable in said body toward and away from said valve seat to control flow from said inlet through said outlet, a pressure chamber in said body above said piston assembly and normally maintaining said piston assembly closed upon said valve seat, a relief valve in said piston assembly for venting said chamber to said outlet, means for opening said relief valve to vent said chamber causing said piston assembly to move away from said valve seat to open flow through said outlet, said body having an interior wall, said piston assembly having an outwardly-directed lip seal bearing against said interior wall, said lip seal being held between facing elements of said piston assembly, said lip seal including an insert and an elastomer overlying and substantially enclosing said insert, said lip seal having an elastomeric lip portion extending into contact with said interior wall and an elastomeric body portion extending between said facing elements, said insert having support elements in contact with at least one of said facing elements, the elastomer overlying said insert being spaced for the support elements so as to leave the support elements exposed for direct contact with said facing elements, the elastomer overlying said insert being spaced from the support elements so as to leave the support elements exposed for direct contact with said facing elements.

2. The flush valve of claim 1 wherein said support elements are in contact with both of said piston assembly facing elements.

3. The flush valve of claim 2 wherein said support elements include a plurality of spaced bosses extending through the elastomer body portion and contacting said facing support elements.

4. The flush valve of claim 3 wherein said lip seal has a plurality of openings, fastening elements extending through said openings to attach said lip seal to said facing elements, said bosses extending about said openings.

5. The flush valve of claim 3 wherein said bosses contact said facing elements when said lip seal is mounted therebetween, said bosses being located slightly beneath the surface of said elastomer body portion when said lip seal is in unassembled condition.

6. The flush valve of claim 1 wherein said insert further comprises portions extending into said elastomeric lip portion and said portions which extend into said elastomeric lip portion include a plurality of outwardly extending fingers.

7. The flush valve of claim 6 wherein said fingers are generally uniformly spaced about the periphery of said insert.

8. The flush valve of claim 7 wherein said fingers have a helical twist from an interior end to an outward end.

9. A piston assembly for use in a flush valve body having an inlet and an outlet, with the body having an interior wall, a valve seat at said outlet, the piston assembly being movable in said body toward and away from the valve seat to control flow from the inlet through the outlet, a relief valve in said piston assembly for venting a flush valve pressure chamber to the flush valve outlet, said piston assembly having an outwardly directed lip seal bearing against said body interior wall, said lip seal being held between facing elements of said piston assembly, said lip seal including an insert and an elastomer overlying and substantially enclosing said insert, said lip seal having an elastomeric lip portion extending into contact with said body interior wall and an elastomeric body portion extending between said facing elements, said insert having support elements in contact with at least one of said facing elements, the elastomer overlying said insert being spaced from the support elements so as to leave the support elements exposed for direct contact with said facing elements.

10. The piston assembly of claim 9 wherein said support elements are in contact with both of said piston assembly facing elements.

11. The piston assembly of claim 10 wherein said support elements include a plurality of spaced bosses extending through the elastomer body portion and contacting said facing support elements.

12. The piston assembly of claim 11 wherein said lip seal has a plurality of openings, fastening elements extending through said openings to attach said lip seal to said facing elements, said bosses extending about said openings.

13. The piston assembly of claim 11 wherein said bosses contact said facing elements when said lip seal is mounted therebetween, said bosses being located slightly beneath the surface of said elastomer body portion when said lip seal is in an unassembled condition.

14. The piston assembly of claim 9 wherein said insert portions which extend into said elastomeric lip portion include a plurality of outwardly extending fingers.

15. The piston assembly of claim 14 wherein said fingers are generally uniformly spaced about the periphery of said insert.

16. The piston assembly of claim 15 wherein said fingers have a helical twist from an interior end to an outward end.

* * * * *